June 4, 1935. M. V. GREEN 2,003,534
MOTOR OPERATED DOOR CONTROL
Filed May 25, 1932 6 Sheets-Sheet 1

INVENTOR.
Mason V. Green
BY
Myron J. Dikeman
ATTORNEY.

June 4, 1935.    M. V. GREEN    2,003,534
MOTOR OPERATED DOOR CONTROL
Filed May 25, 1932    6 Sheets-Sheet 2

INVENTOR.
Mason V. Green
BY
Myron J. Dikeman
ATTORNEY.

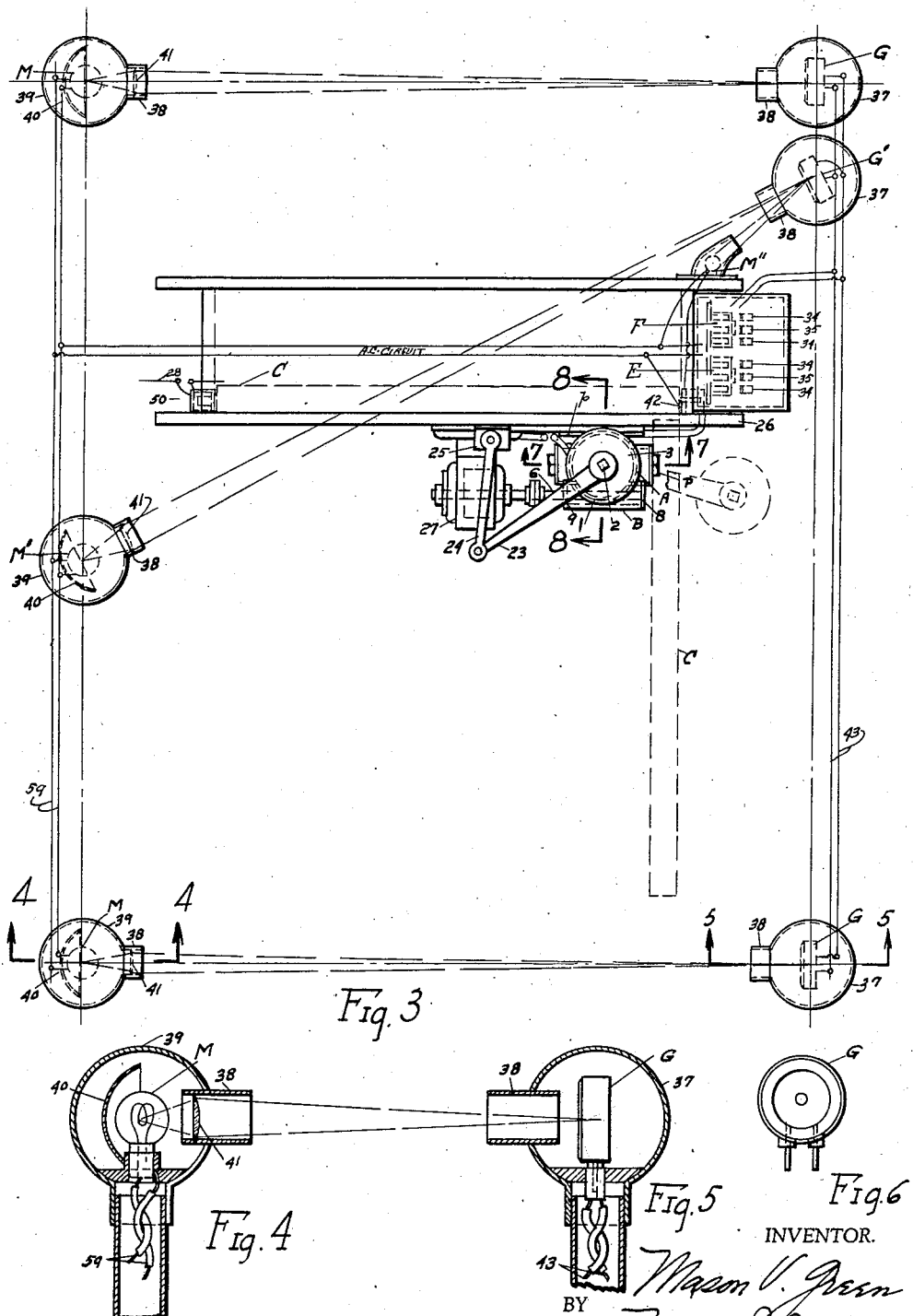

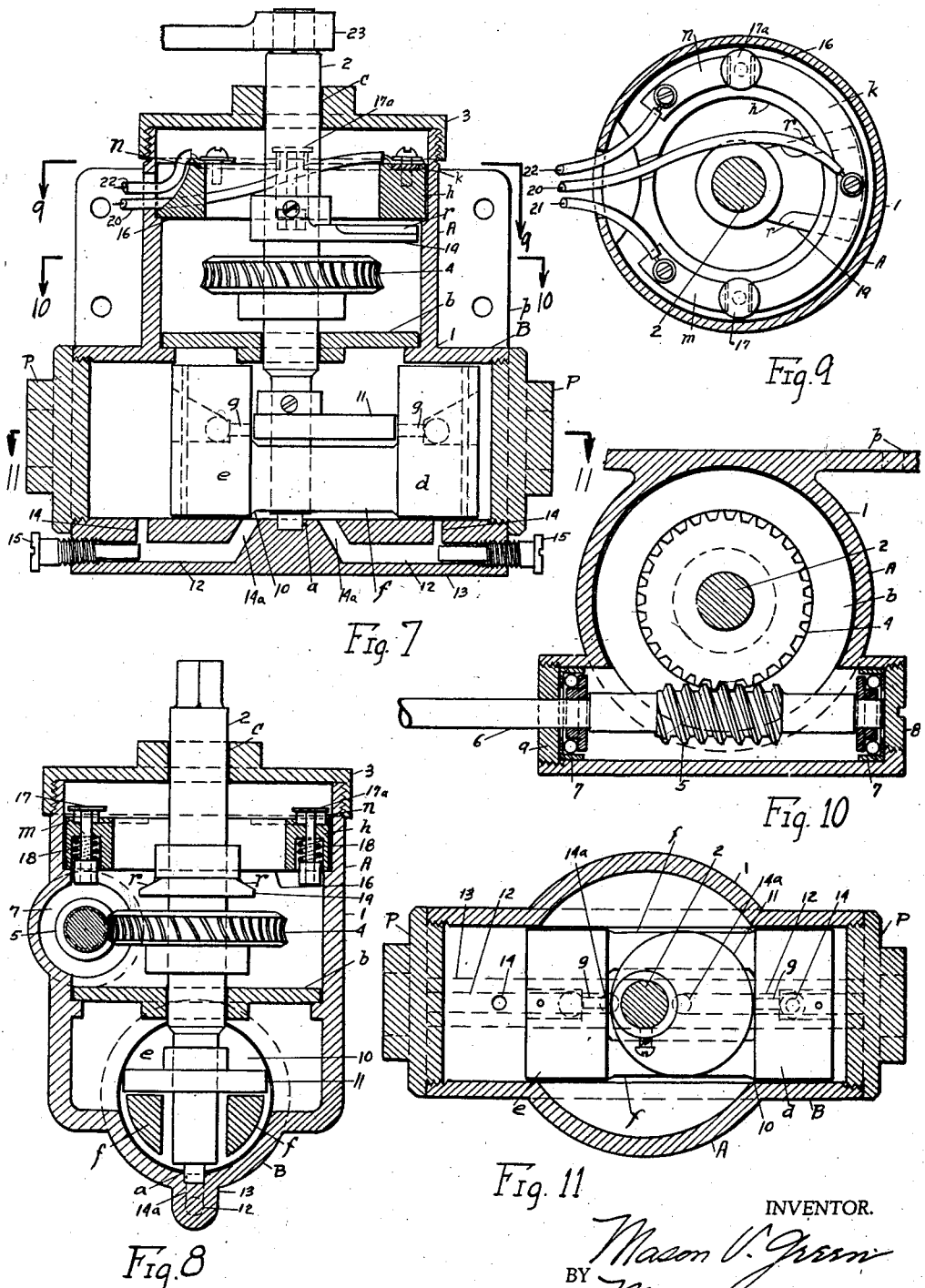

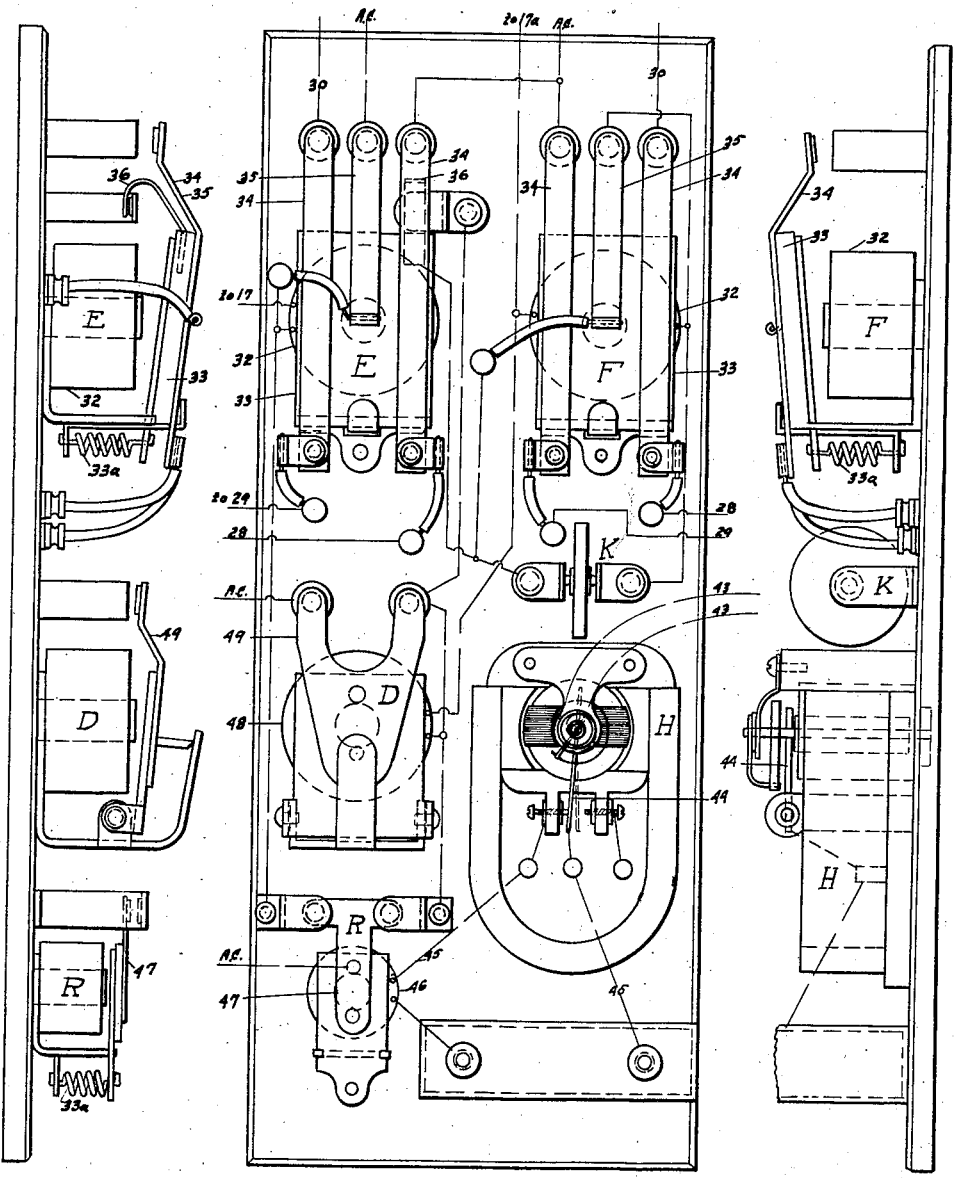

Patented June 4, 1935

2,003,534

UNITED STATES PATENT OFFICE 2,003,534

MOTOR OPERATED DOOR CONTROL

Mason V. Green, Lansing, Mich., assignor to Frank D. Hayes, trustee for F. D. Hayes Electric Company, Lansing, Mich., a firm Application May 25, 1932, Serial No. 613,537

4 Claims. (Cl. 268—65)

This invention relates to a door opening device and is a modification of my former design as shown in Patent application Serial No. 597,100, filed May 7, 1932, utilizing a reversible electric motor in the place of the special solenoid units therein shown.

The object of my invention is to produce an automatic door operating device, suitable for opening and closing movably mounted door panels, either of the swinging or sliding type, and that will operate without the aid of manual means.

Another object is to provide a door operating device actuated by a connected reversible electric motor which is controlled by photo-electric cells and relay instruments, so adjusted that the approach of any person or object on either side of the door panel will automatically operate the sensitive cells and connected relay instruments for both opening and closing the connected door.

A further object is to provide a two way door operating device that will open by the reaction of the photo-electric cell positioned on one side of the door panel, and close by the reaction of the photo-electric cells positioned on the opposite side of the door, thus preventing the closing of the door until the object or person has fully passed.

A still further object is to produce a cell controlled door opening device that operates noiselessly, suitable for hospital and hotel use, but so connected that the door panel may be operated manually when desired.

These several objects are attained in the preferred form by the construction and arrangement of parts more fully hereinafter set forth.

Similar parts on all drawings are marked by similar numerals or letters.

Fig. 3 is a top view of the assembled door and connected operating mechanism showing the general arrangement of the cell and light controlling units.

Fig. 4 is a vertical sectional view of one of the source light units taken on the line 4—4 of Fig. 3, showing the general arrangement of the interior parts.

Fig. 5 is a vertical sectional view of one of the photo-electric cell units showing the interior arrangement of the cell and light entrance tube.

Fig. 6 is a front view of one type of photoelectric cell, and is illustrative of any cell of the photo electric type.

Fig. 7 is a vertical sectional view through the door operating unit taken on the line 7—7 of Fig. 3 showing the general arrangement of the interior operating parts.

Fig. 8 is also a sectional view cross-wise of the same operating unit taken on the line 8—8 of the Fig. 3 showing the relative position of the operating gears and the adjusting plunger cam.

Fig. 9 is a horizontal sectional view through the operating unit taken on the line 9—9 of Fig. 7 showing the limit switch for the opening and closing circuits.

Fig. 10 is another horizontal sectional view taken on the line 10—10 of Fig. 7 showing the drive worm and gear.

Fig. 11 is also a horizontal sectional view taken on line 11—11 of Fig. 7 showing the retarding plunger and cam operating member.

Fig. 12 is a front view of the assembled electric relay and contactor instruments as are connected within the several separated electric circuits controlling the reversible operating motor and door opening mechanism.

Fig. 13 is a side view of the assembled instruments shown in Fig. 12, showing the operating positions and connections of the instruments along the left side of the board.

Fig. 14 is a side view of the same assembled instrument board shown in Fig. 12 showing the operating positions and connections of the various instruments mounted along the right side of the board.

Figure 16:
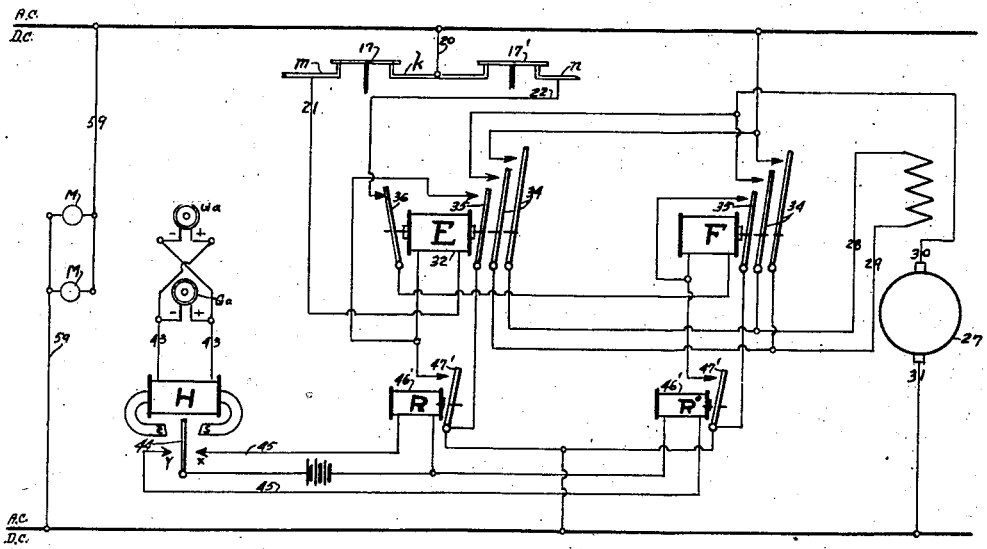

Fig. 16 is a modified wiring diagram showing the electric connections between the various cells, lights and controlling instruments connected with the motor and door operating unit, where the door panel is opened by the reaction of one cell on one side of the door, and is closed by the reaction of the cell positioned on the opposite side of the door, and will leave the door panel standing open until the object or person has passed both sets of cells.

In general, my device comprises a reversible electric motor of any type, or winding, fixedly mounted on the top of a movably mounted door panel, herein illustrated as a swinging door, connected with suitable door operating mechanism for opening and closing the door as the motor is rotated in opposite directions. The motor being controlled by sensitive photo-electric cells and relay instruments mounted within separated electric circuits connected to the motor fields. The cells with cooperative light sources are arranged in pairs and positioned on opposite sides of the swinging door panel so that the approach of any person or object, as it passes the cell and breaks the light rays falling thereon will automatically operate the connected sensitive relay and contactor instruments of the various electric circuits leading to the motor, in a manner to open the door panel, and after a short pause close it again by reversing the rotation of the motor. The electric magnets of the various relay and contactor instruments are connected in separated electric circuits, so that each contactor may be energized at the required time for operating the specific instrument. The type of electric current is not material to my invention as long as the various instruments are provided with corresponding field windings.

While I have shown the controlling relay and contactor instrument as mounted on the side of the door casing for cenvenience in illustration, they may be mounted at any location desired, even in a separate room or basement.

I will now describe more fully the detailed construction of my device referring to the drawings and the marks thereon.

Figure 1:
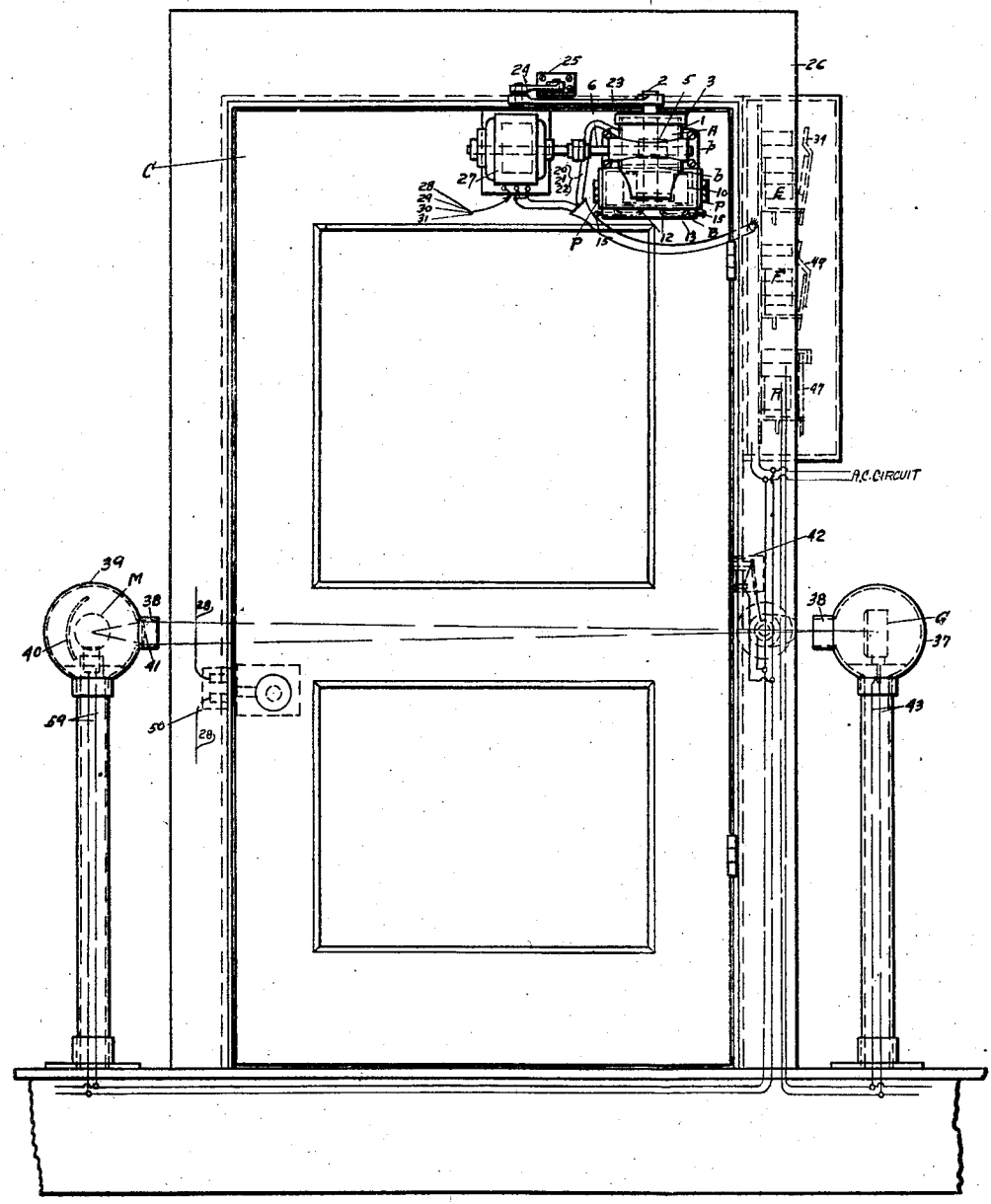
Fig. 1 is a front view of a closed door panel having the door operating mechanism mounted thereon and showing the operating photo-electric cell and source light mounted in front thereof.
Figure 2:
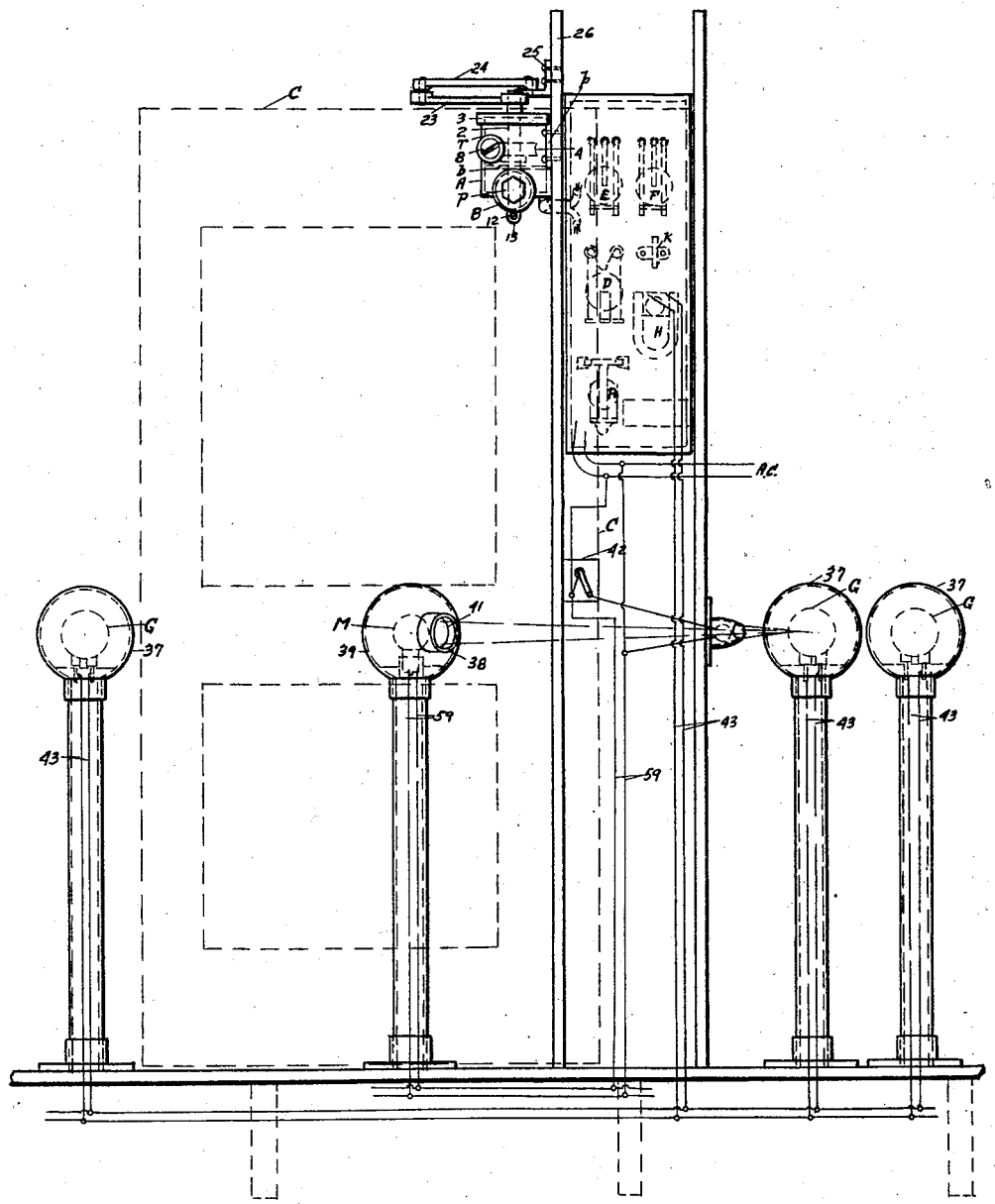
Fig. 2 is a side view of the assembled door and door casing with the operating mechanism showing the relative position of the operating units connected thereto.

The casing 1 is made of metal, preferably cast in a single unit, and is formed a hollow inverted T-shaped tubular section having a vertical cylindrical chamber A opening into a horizontal cylindrical chamber B which is positioned across the bottom end thereof and at right angles thereto, the axis of both cylindrical chambers intersecting each other. The casing 1 is provided with a suitable attaching flange p with screw holes formed therein, for fixedly mounting the casing along the top edge of a door panel C as shown in Fig. 1 of the drawings. Through the center of the vertical chamber A, positioned concentric with the casing axis, is mounted an operating shaft 2, rotatably mounted in the bottom casing bearing a and the fixedly mounted collar bearing b of the vertical chamber. The operating shaft 2 is further supported by the bearing c formed through the casing cap 3 which is secured to the upper end of the chamber A, allowing free rotation of the shaft 2 at all times. Fixedly mounted on the shaft 2 is a drive worm gear 4 positioned near the lower end of the vertical chamber A, the gear 4 meshing with a drive worm 5 which is mounted on a drive shaft 6. The drive shaft 6 is rotatably mounted in the bearings 7 positioned in the casing side walls, the bearings 7 being of the thrust bearing type prevent any end-wise movement of the shaft 6 when power is applied thereto. Adjusting collars 8 and 9 are threadably mounted in the bearing openings for supporting and adjusting the shaft bearings 7.

Within the horizontal chamber B is slidably mounted a double plunger piston 10 closely fitted to the chamber walls and formed with separated valved plunger heads d and e which are rigidly connected together by the side rims f. The double plunger piston 10 is of a shorter length than the inclosing casing B, and is free to oscillate therein. The chamber B is closed at both ends by the end plugs P threadably mounted therein, the chamber being partially filled with a suitable retarding liquid such as oil, or like fluid. The valved ports g of the piston plungers d and e allow a free flow of the liquid from the center recess between the plunger heads, outward toward the piston ends, but close when end pressure is applied to the outer piston ends as would result when the piston is moved in either direction, thus retarding the piston movement. Fixedly mounted on the shaft 2 near the axis of the chamber B is an eccentric operating cam 11 which engages the inner faces of the piston plunger heads and causes an oscillating movement of the piston 10 as the shaft 2 is rotated.

Directly beneath the chamber B are provided two short liquid escape channels 12 formed lengthwise through the casing rib 13, each channel connecting the casing end chamber with the center section positioned between the plunger heads through the small wall ports 14 and 14a, the size of the end ports 14 being regulated by a valve screw 15 threadably mounted in the channel ends. As the piston 10 is moved in either direction by the cam 11, the liquid within the chamber is forced out of the chamber end through the port 14 and into the center chamber recess, and when the end ports 14 are adjusted and restricted will act to retard the piston movement, preventing any sudden change of position, although the ports will allow any steady movement of the piston in either direction.

Within the upper end of the vertical chamber A is mounted a limit switch 16, which is a combination opening and closing switch, formed of an annular ring h made of some suitable insulating material and is fixedly mounted within the chamber walls positioned concentric with the chamber axis. The ring h carries fixedly mounted on the top surface thereof three metal contact segments k, m and n, said segments being position circumferentially around the ring surface, and provided with an open space between the segment ends so that the segments are completely insulated from each other. Centrally positioned through the spaces between the center segment k and each end segment m and n is slidably mounted the opening and closing contact pins 17 and 17a, the heads of which form a contact with the segment ends and close electric circuits through the respective segments. Both of the pins 17 and 17a are extended through the insulator ring h and projected beneath the ring bottom and each carries a spring member 18 mounted thereon, the springs being stressed to close the contact pins on the segment ends when the pins are disengaged by other members. Fixedly mounted on the shaft 2, directly beneath the limit switch ring 16, is a contact cam 19 formed with beveled edge walls r, and positioned to engage and lift both of the contact pins 17 and 17a as the cam is rotated thereunder for breaking the electric circuit through the center segment k and either of the opening and closing end circuit segments m or n. The segment ends and intervening contact pins being positioned to engage with the cam 19 when the door panel C is in its extreme open or closed position. Electric terminal wires 20, 21 and 22 are connected to the metal contact segments k, m and n respectively and lead to two separated electric circuits directed through the opening and closing contactor instruments E and F, for forming or breaking the electric circuits therethrough, as the door panel C reaches its extreme positions.

Fixedly mounted on the upper end of the shaft 2, outside the casing end cap 3, is an operating arm 23, positioned at right angles to the shaft and rotatable therewith, said arm 23 being extended to one side and in front of the supporting casing 1, and is positioned slightly above the top door panel edge. Pivotally connected to the outer end of the operating arm 23 is a push arm 24 which has its opposite end pivotally connected to a wall bracket 25 fixedly mounted on the door casing 26. Also mounted on the door panel C adjacent the casing 1, is an electric motor 27, of a reversible type, the motor may be of any chosen design or winding that will allow its rotations to be reversible at will, by changing or alternating the electric current through the various motor fields. The motor 27 is preferably connected directly to the drive shaft 6 of the door operating unit, although any geared connection will operate in like manner. The double motor circuits are provided with the terminal wires 28, 29, 30 and 31, for changing the directional rotation, the separated circuits leading through the opening and closing contactor instruments E and F, and which are effected by the limit switch 10 as the door panel C reaches its extreme positions. The magnetic coils of the various relay and contactor instruments being energized either by direct action of the photo-electric cells, or by some circuit closer on some of the instruments indirectly effected thereby, closing separated electric circuits therethrough.

A time delay switch K is mounted within the instrument circuit between the opening and closing contactors E and F to cause a slight delay in operation between the opening and closing mechanical movements. Each of the contactors E and F are provided with electro magnets 32 and a movable contact switch arm 33. The switch arms 33 carry mounted thereon special terminal bars 34 and 35, each of which closes with a special terminal post positioned therebeneath, the terminal bars 34 of the respective opening and closing contactors E and F are connected with the separated circuits through the reversible motor 27 through the connecting circuit wires 28, 29 and 30, while the terminal bars 35 closes the respective electric circuits through the magnet coils of each of the instruments. The switch arms 33 of each instrument are held in an open position when not energized by a magnetic current therethrough, by an attached spring member 33a. An added terminal bar 36 is mounted on the under side of the switch arm 33 of the opening contactor E, and which remains open when the magnet coil of the instrument is energized for closing said switch arm thereon, but which forms a contact with its hooked terminal post 36a when the switch arm 33 is released, closing and continuing the electric circuit through the time delay switch K before entering the closing contactor magnet coil for energizing the contactor F.

Figure 15:
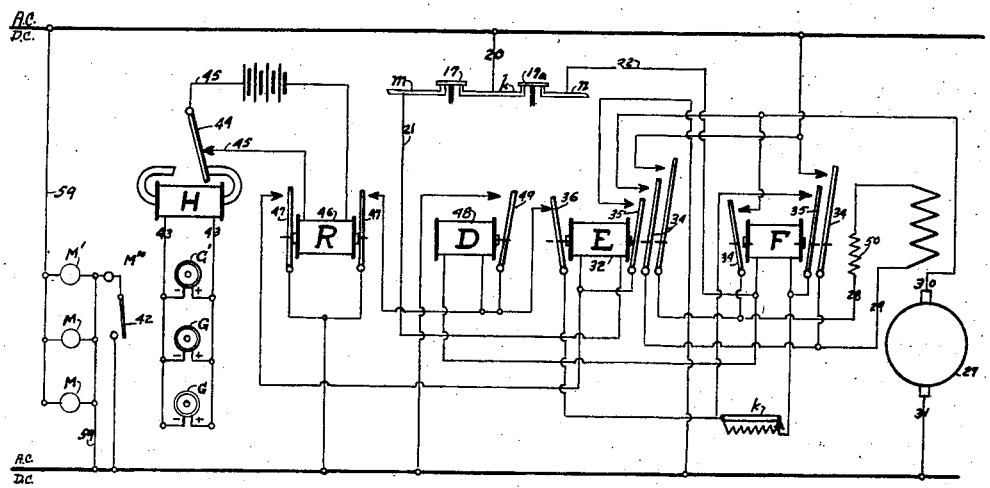
Fig. 15 is a wiring diagram showing the electric connections between the photo-electric cells, source lights and various relay and contactor instruments as are mounted in the separated electric circuits leading to the motor and door operating unit where the closing of the door automatically follows the opening thereof by the reaction of the same photo-electric cell.

The wiring diagram shown in Fig. 15 of the drawings shows the complete set up and wiring of the various instruments within the separated electric circuits, and the relay connection leading to the sensitive photo-electric cells.

Positioned on opposite sides of the door C are fixedly mounted sensitive photo-electric cells G, each being mounted within a suitable casing head 37 which is herein illustrated as an ornamental newel post securely attached to the floor in the ordinary manner. Any fixedly mounted casing head desired may also be used. The casing heads 37 are provided with side light tubes 38, each positioned parallel to the door panel C. The photo-electric cells G may be of any suitable standard type, several of which are now on the market, the design herein illustrated being of the disc type, the cells, where several are used, are preferably connected within a parallel electric circuit which leads to a sensitive cell relay instrument H, and with some types of cells may require a low voltage, but which is not illustrated or shown with the cell herein indicated. Positioned directly opposite each of the cells G, along the opposite side of the door edge, is a light source bulb M, also mounted within a casing head 39 as mounted on top of a newel post, and is also provided with a side light tube 38, each facing the light tube 38 of its respective cell. The light source bulbs M are also preferably connected in parallel within any suitable electric lighting circuit by the circuit wires 50. Any type of electric bulb may be used that will produce a steady light ray. The light rays from each of the light source bulbs M are focused directly upon its respective cell G positioned opposite thereof, and the light rays must be accurately adjusted and balanced so that the same light density falls on each cell, as different light densities on different cells will cause the cell to function and react to operate the connected sensitive cell relay H, and start the door operating mechanism. It is preferable to provide the light source bulbs M with suitable reflectors 40 and lens 41, for more accurately focusing the light rays directly to the cell centers. The photo-electric cells G are manufactured units now on the market, and transform light energy directly into electric energy, thus being capable of effecting a sensitive cell relay instrument which is also connected in another electric circuit leading to other relay and contactor instruments.

If desired, an extra pair of cell and light source units G' and M' may be positioned diagonally through the door opening as illustrated in Fig. 3 of the drawings, and so focused that the light intensity is the same as in the other pairs of units. The diagonal pair of units will function to prevent the closing of the door when a person or object is standing within the door way as this position will break the light rays the same as in any other set. As the door panel C is being closed, a cooperative source light M'' positioned on the same side of the door as the cell G' and adjacent thereto, is lighted by the closing of a mechanical switch 42 at the time the rays are being broken by the closing door edge, thus continuing the density on the cell and preventing the reopening of the door. The diagonal set of light and cell units may be omitted as desired, depending upon the use of the door.

All of the photo-electric cells G which are connected in parallel circuit are connected to a sensitive cell-relay instrument H by the terminal wires 43. The cell-relay is a light sensitive device for controlling an auxiliary circuit which operates through the unit. The relay unit responds to any substantial decrease in light density falling on the connected photo-electric cell. The relay contact point 44 being connected within a very low voltage battery circuit by the circuit wires 45 leading to the magnet coil 46 of the sensitive auxiliary relay instrument R, the relay contact point being always closed except when reacted upon by the cells G, thereby constantly energizing the magnet coil 46 of relay R, and holding the switch terminals 47 open, as indicated in Fig. 13 of the drawings, except when they are momentarily released for an instant only as the cell energy reacts through the connected cell-relay H. The momentary closing of the switch terminals 47 of the auxiliary relay R, also closes a double electric circuit leading through these terminals and through the magnetic coils 48 and 32 of the holding contactor and opening contactor D and E respectively, thus energizing both of these coils and closing their respective switch arms thereon, and likewise closing the electric circuits through their respective terminal bars, the bars 34 connecting the opening circuit through the motor 27. The terminal bar 49 as mounted on the switch arm of the holding contactor D, and the terminal bar 35 as mounted on the opening contactor E, close separate electric circuits through their respective magnetic coils and continue to energize these coils even after the momentary contact from the auxiliary relay R is broken. The holding contactor D functions to keep the electric circuit closed through the coil 32 of the opening contactor E until that circuit is broken by the lifting of the contact pin 17 in the limit switch 16, as the door panel C reaches its extreme open position, and as the magnetic coil 32 of the contactor E is de-energized the switch arms open the terminal bars 34 and stop rotation of the motor 27, but the opening of the switch arm 33 also closes the contact of the terminal bar 36 and 36a and continues the electric current through the holding contactor D through a thermo time delay switch K into the magnet coil 32 of the closing contactor F, and which upon the closing of the switch arm 33 by magnetic reaction of the coil, also closes the terminal bars 34 closing the electric circuit through the reverse field of the motor 27, which functions to close the door panel C through the connected operating mechanism within the casing 1. As the door panel is closed within the door casing, the contact pin 17a is lifted within the limit switch 16 and the motor circuit again broken, and which breaks the circuit through the magnets of both the holding contactor D and the closing contactor F, leaving the entire instrument control at rest, until again energized by a new reaction from some of the photo-electric cells.

Where desired, an electric door lock 50 may be installed within the door casing 26 and connected electrically within the circuit wires 28 or 29 of the motor opening circuit, and which will function to unlock the door panel automatically as the motor 27 is started to rotate for opening the door.

When the device is completely installed and adjusted, and the light rays from the source bulbs are directed upon their respective cells, the breaking of the rays of light on any cell will react upon the connected sensitive cell relay, directing various separated electric circuits through the relay and contactor instruments as heretofore described, and automatically open the connected door panel, and after a short pause, reverse the electric current through the operating motor and again close the door. If at any time during the closing operation, the light rays on any cell are broken, the instruments and connected door operating mechanism will function to re-open the door without completing the closing operation.

Fig. 16 of the drawings shows a modified wiring diagram for the instruments, where the opening and the closing contactors E and F are connected into separate independent circuits and function independently of each other. The holding contactor D and the thermol time delay switch K are omitted, and the sensitive cell-relay H is so adjusted that the contact point 44 is in its open position between the inclosing terminal points s and t, and a separate low voltage battery circuit having a sensitive auxiliary relay R or R' therein connected to each terminal point. The auxiliary relay R being connected with the opening contactor E as in the former case, and the auxiliary relay R' of the other battery circuit being connected with the closing contactor F in like manner. The two photo-electric cells Ga are connected to the cell-relay H in reversed polarity order, i. e., a positive and a negative pole of each cell is connected to each pole of the cell-relay, so as to cause the cell-relay contact point 44 to move in both directions, and to function with both battery circuits leading to the auxiliary relays R and R'. Thus when the light rays on the cell inside the door are broken, the relay contact point 44 will be moved to close the contact circuit at x with the auxiliary relay R and operate the opening contactor E for opening the door, and cease to function as the circuit is broken by lifting of the contact pin 17 in the limit switch when the door reaches its extreme open position. Then when the person or object moves past the cell on the outside of the door breaking the light rays thereon, the cell-relay contact point 44 will move to the opposite side and close the circuit at y with the other auxiliary relay R' leading to the closing contactor F, and close the door again, the circuit being broken by the lifting of the contact pin 17' as the door reaches its closed position. This type of wiring adapts the device to use with doors requiring delays in closing the door. The operation is practically the same as heretofore described, except for the delay between the opening and closing operation, and that is operative from one side only.

While I have illustrated my device with the preferred type of relay and contactor instruments, it is apparent that various modifications in both instrument units, arrangement of set-up may be made without departing from the spirit of my invention, and that various types of sensitive cells, motors, relays and contactors, and time delay switches may be used to replace those illustrated herein, and I claim as my invention the device as herein shown, and any modification thereof that is substantially a substitution of parts or sections herein illustrated.

Having fully described my motor operated door control, what I claim as my invention and desire to secure by Letters Patent is:

1. A light sensitive door operating device adapted for opening and closing a door panel within a door casing and used in combination therewith, comprising a hollow tubular casing member suitable for attaching to one of the said door members, a single operating shaft rotatably mounted aximetrically therethrough and projected from one end thereof, jointed door operating lever mechanism fixedly mounted on the projected shaft end and having its opposite end operatively connected to the other door member, a power gear fixedly mounted on said operating shaft within the casing, a reversible electric motor having an extended drive shaft with drive gear attached, mounted thereon, and positioned to mesh said drive gear operatively with the power gear of the operating shaft, a circular, reversing switch mounted within said casing, positioned concentric with the shaft and operated thereby, said reversible electric motor being connected in two separated electric power circuits each leading through said reversing double current switch, shaft rotation retarding means mounted within said casing and connected to the operating shaft in a manner capable of retarding its rotation in either direction, a series of electric circuit contactor instruments mounted within the separated motor power circuits and provided with a sensitive electric relay instrument connected within one of the contactor instrument circuits, a series of photo-electric cells mounted along one side of the door passageway at pre-determined locations, all of said cells being electrically connected with the sensitive relay instrument, and a corresponding series of co-operative light source units connected in any electric light circuit positioned along the opposite side of the door passageway and each adjusted to reflect light rays on their respective photo-electric cell, one set of cell and light source units being positioned diagonally through the door way.

2. A light sensitive door operating device adapted for opening and closing a door panel within a door casing and used in combination therewith, comprising a hollow closed tubular casing suitable for fixedly mounting on one of said door members, said casing being formed with oppositely arranged cylindrical plunger chambers at one end thereof, positioned symmetrical with the tubular casing axis and at right angles thereto, a single straight operating shaft rotatably mounted aximetrically through said tubular casing, pivoted door operating members having one end fixedly mounted on the operating shaft and having its opposite end operatively connected to the other door member, said shaft having a power worm gear fixedly mounted thereon, a reversible electric motor with extended drive shaft and attached drive worm mounted on said casing positioned to mesh said drive worm with the power worm gear of the operating shaft operatively, a circular reversing switch with insulated double circuit contact terminals and terminal connectors fixedly mounted within said casing concentric with the operating shaft, a switch operating cam mounted on the operating shaft adjacent the circular switch for actuating the terminal connectors, said reversible motor being connected within two separated electric power circuits leading through the double switch terminals, a double retarding plunger with retarding means mounted within the plunger chambers, cam means fixedly mounted on the operating shaft positioned to engage said double plunger and displace same within the chamber recesses against the retarding means, a series of electric circuit contactor instruments mounted within the separated motor circuits and provided with a sensitive relay electric instrument connected within one of the contactor instrument circuits, and a series of photo-electric cells with their co-operative light source units mounted in pairs across the door passageway at pre-determined positions, all of said cells being connected electrically with the sensitive electric relay instrument.

3. A light sensitive door operating device adapted for opening and closing a door panel within a door casing and used in combination therewith, comprising a hollow tubular casing suitable for fixedly attaching to the door panel, said casing being formed with oppositely positioned cylindrical plunger chambers at one end thereof, positioned symmetrical with the tubular casing axis and at right angles thereto and with intervening liquid passages leading between said plunger chambers, a single operating shaft rotatably mounted aximetrically through the tubular casing and provided with door operating lever mechanism mounted thereon, said lever mechanism having its opposite end operatively connected with the door casing, a power worm gear mounted on the operating shaft, a reversible motor having an extended drive shaft with drive worm attached mounted on said door panel and connected with the casing, positioned to mesh the drive worm operatively with the power worm gear of the said operating shaft, a circular reversing switch with double terminal members and terminal connectors mounted within the casing, concentric with the tubular casing axis, cam means mounted on the operating shaft capable of actuating the terminal connectors of the double switch, said reversible motor being connected in two separated electric power circuits each operating through one of the terminals of the double switch, said power circuits being closed alternately as the operating shaft alternates in rotation, a double, valved plunger with liquid retarding means mounted within the cylindrical plunger chambers and capable of reciprocating therein, cam means fixedly mounted on the operating shaft positioned to engage said double plunger operatively for displacing same within said chambers and producing a retarding pressure on the operating shaft, a series of electric circuit contactor instruments mounted within the separated motor power circuits and provided with a sensitive electric relay instrument and time delay unit electrically connected within one of the contactor instrument circuits, a series of photo-electric cells mounted along one side of the door passageway on both sides of the door, all electrically connected with the relay instrument, and a corresponding series of co-operating source light units mounted along the opposite side of the door passageway positioned to reflect light rays in their respective cell units, one set of cell and light units being positioned diagonally through the doorway.

4. A door operating unit adapted for opening and closing a door panel within a door casing and used in combination therewith, comprising a hollow tubular casing suitable for fixedly mounting on one of the door members, said casing being formed with oppositely arranged cylindrical plunger chambers at one end thereof, positioned symmetrically with the casing axis and at right angles thereto, a single operating shaft rotatably mounted aximetrically through said casing and provided with lever door operating mechanism mounted on one shaft end, said mechanism being suitable for operatively connecting to the opposite door member, a power worm gear fixedly mounted on said operating shaft, a reversible electric motor having an extended drive shaft with drive worm attached mounted thereon connected with the casing and positioned to engage the drive worm operatively with the power worm gear, a circular reversing switch mounted within the tubular casing concentric with the operating shaft, cam means mounted on the operating shaft for reversing the switch, said reversible motor being connected within two separated electric power circuits each leading through the reversing switch, a double retarding plunger mounted within the casing cylindrical chambers capable of reciprocating therein, both plunger and casing being provided with liquid passage for conveying liquid from one cylinder plunger chamber to the other, and cam means mounted on the operating shaft positioned to engage and reciprocate said double plungers within its respective chambers as the said shaft is alternately rotated.

MASON V. GREEN.